United States Patent [19]

Mette

[11] Patent Number: 4,730,366

[45] Date of Patent: Mar. 15, 1988

[54] APPARATUS FOR DELIVERING PORTIONS OF A PASTY SUBSTANCE

[75] Inventor: Manfred Mette, Hamburg, Fed. Rep. of Germany

[73] Assignee: Nordischer Maschinenbau Rud. Baader GmbH & Co., KG, Lubeck, Fed. Rep. of Germany

[21] Appl. No.: 52,771

[22] Filed: May 20, 1987

[30] Foreign Application Priority Data

May 23, 1986 [DE] Fed. Rep. of Germany ....... 3617396

[51] Int. Cl.$^4$ ............................................. A22C 11/04
[52] U.S. Cl. ............................................. 17/37; 17/32
[58] Field of Search .................... 17/37, 36, 49, 33, 32

[56] References Cited

U.S. PATENT DOCUMENTS

| | | | |
|---|---|---|---|
| 2,666,229 | 1/1954 | Vogt | 17/32 X |
| 3,489,104 | 1/1970 | Wolff | 17/32 X |
| 4,596,063 | 6/1986 | Mette | 17/37 |

Primary Examiner—Willie G. Abercrombie
Attorney, Agent, or Firm—Thomas R. Morrison

[57] ABSTRACT

An apparatus for conveying pasty substances, for example sausage stuffing, is designed as a radial displacer piston conveyor for a rotary angle-proportional delivery of substance portions. This is made possible by designing a control cam section controlling the substance discharge as a circular involute. It is proposed to reduce the large and theoretically infinitely high acceleration forces acting on each displacer piston at the instant of the start of its discharge action by designing the involute section of the control cam with a run-up section and a run-off section, each, whose courses are designed mirror-inverted to each other. The arrangement thereof is such that at the instant when one displacer piston runs onto said run-up section, the preceding piston enters the run-off section, so that, during the passage of those two cam sections, two displacer pistons, each, participate in the substance discharge. The acceleration values thereof add up to become zero.

4 Claims, 3 Drawing Figures

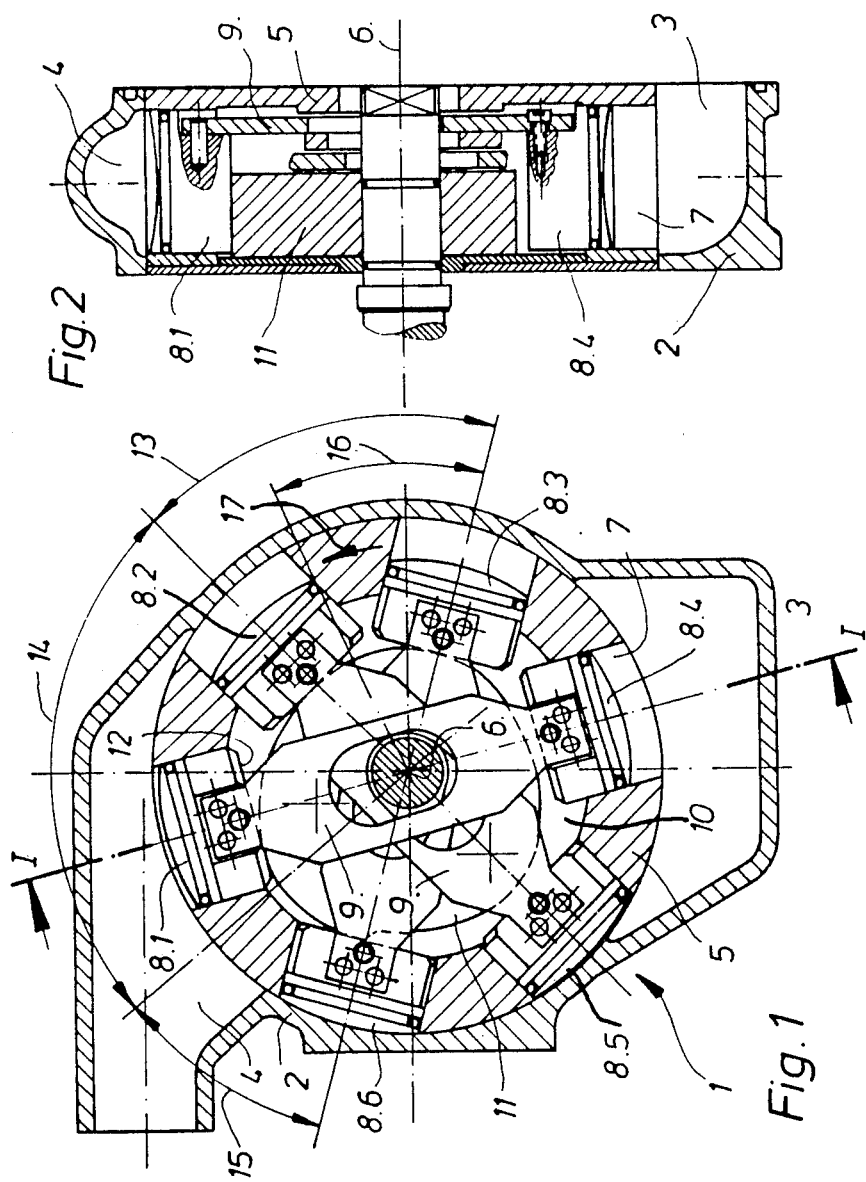

APPARATUS FOR DELIVERING PORTIONS OF A PASTY SUBSTANCE

BACKGROUND OF THE INVENTION

1. Field of the Invention

The invention relates to an apparatus for delivering portions of uniform weight and/or volume of a pasty substance, particularly sausage stuffing, the apparatus comprising a conveying mechanism, which includes a rotor, driven to rotate about an axis of rotation, and a casing, designed with at least one supply and one discharge opening, each, said rotor comprising a stationary control cam designed with a discharge motion controlling section; a plurality of portion chambers for receiving the substance to be delivered; and a corresponding number of displacer pistons arranged in the portion chambers to be displaced therein during the rotation of the rotor by operatively engaging said cam, the displacement being such that, over a complete rotation of said rotor, proportionality is obtained between the discharge of the substance and the angle of rotation of the rotor.

2. Prior Art

An apparatus of this type is known from DE-OS No. 34 09 517. The conveying mechanism for pasty substances disclosed therein has the features of a radial piston pump. Therein the radial displacement motion of the displacer pistons takes place by a fixed control cam, against which the displacer pistons support during the rotation of the rotor receiving the pistons. In accordance with the position of the discharge opening of the casing, the arrangement of the displacer pistons, as well as the association of the section of the control cam responsible for the portioning stroke of the displacer pistons, is such that the discharge motion of anyone of them starts at the instant at which the preceding one has ended its discharge movement. With respect to the objective of achieving proportionality between the conveying volume and the angle of rotation of the rotor, both for the start of the discharge motion of a displacer piston and for the end of the discharge motion of the preceding piston, there are theoretically infinitely high acceleration values on the pistons. Due to the elasticity of the system these values are, of course, not reached in practice, but they are, nevertheless, sufficiently high for the known conveying mechanism to run in an extremely rough manner. This leads to an unpleasant evolution of noise and to above-average wear. Moreover, the differences in the motions occurring in practice compared with the theoretical values cause fluctuations in the dosing accuracy.

3. Objects of the Invention

It is therefore an essential object of the present invention to suggest a rotary conveying mechanism having conveying characteristics proportional to the angle of rotation. It is a further major object to suggest such a mechanism which runs smoothly and therefore at low noise and with little wear.

SUMMARY OF THE INVENTION

In an apparatus comprising a conveying mechanism, which includes a rotor, driven to rotate about an axis of rotation, and a casing, designed with at least one supply and one discharge opening, each, said rotor comprising a stationary control cam designed with a discharge movement controlling section; a plurality of portion chambers for receiving the substance to be delivered; and a corresponding number of displacer pistons arranged in the portion chambers to be displaced therein during the rotation of the rotor by operatively engaging said cam, the displacement being such that, over a complete rotation of said rotor, proportionality is obtained between the discharge of the substance and the angle of rotation of the rotor, these objects are achieved, according to the invention, in that the discharge motion controlling section of the cam comprises a starting or run-up section, an involute section and a run-off section, each, the starting and the run-off sections being designed such that the summation value of the imaginary radii drawn between the rotor axis and the engagement points of the displacer pistons engaging said sections, respectively during the discharge of the substance follows a linear function depending on the rotational angle $\theta$ of the rotor.

The resulting advantages are, in particular, that the motions of the displacer pistons can be optimized independently of the proportionality to be obtained, according to the objects of the invention, between the feed volume and the rotation angle under the standpoint of minimum stressing.

A preferred embodiment is achieved in a radial piston conveying mechanism, in which the rotor mounted in the casing of the conveying mechanism is provided with at least six radially positioned portion chambers with displacer pistons displaceably guided therein, and in which the control cam is arranged so as to support the underfaces of the displacer pistons directed towards the rotor axis.

A very simple embodiment is obtained if opposing displacer pistons are rigidly interconnected, because, in this way, only one control cam controlling the discharge motion of the displacer pistons is necessary, which cam simultaneously effects the retraction motion of the opposing displacer pistons for filling the portion chambers.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a sectional plan view of a radial piston conveying mechanism;

FIG. 2 shows a central cross-section I—I through the conveying mechanism along the axis of a pair of displacer pistons;

DETAILED DESCRIPTION OF THE PREFERRED EMBODIMENT

Figure 3:
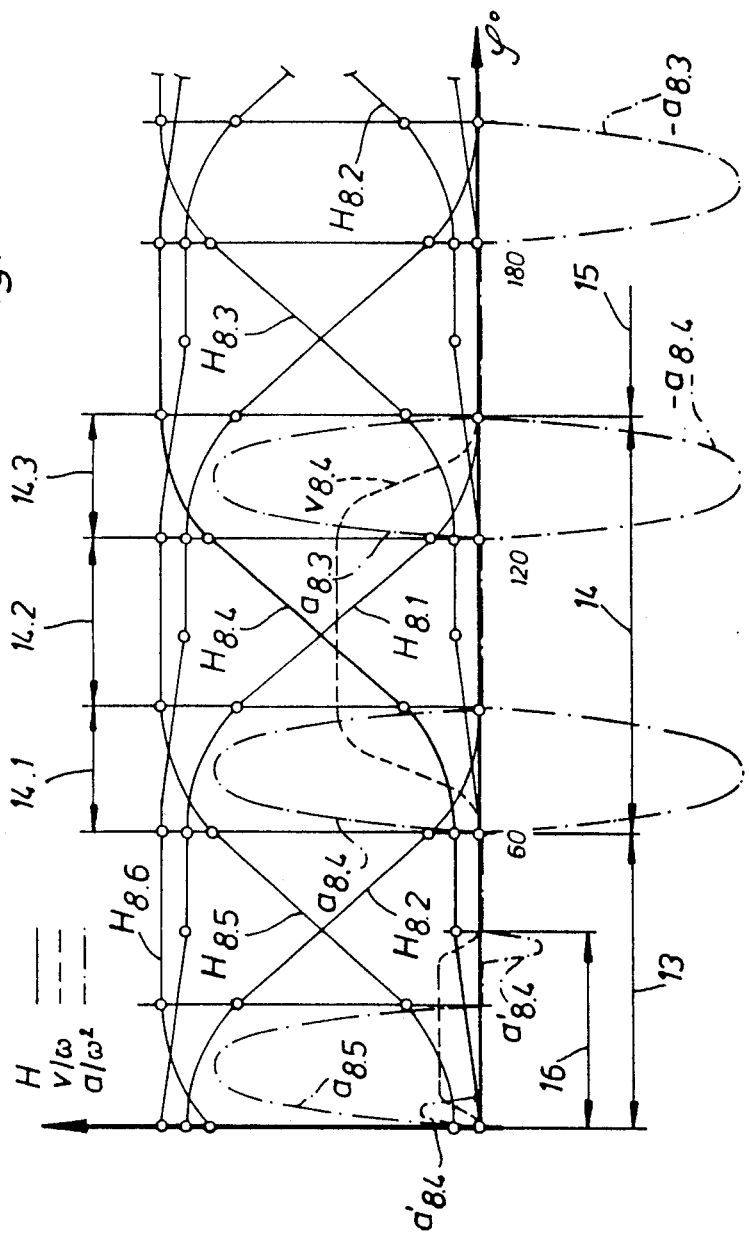
FIG. 3 shows the motion diagram of the displacer pistons.

According to FIG. 1, a casing 2 of a conveying mechanism 1 is provided with a supply opening 3 and a discharge opening 4 approximately opposing each other. The casing 2 surrounds a rotor 5 fitted both radially and axially in a self-sealing manner, which rotor is driven in a suitable manner to rotate about an axis 6. The rotor 5 has bores forming portion chambers 7 and having their axes running centrally and crossing at an angle of 60°. These portion chambers 7 serve to receive displacer pistons 8.1 to 8.6, which are fitted with an easy sliding fit. Two opposing displacer pistons each are detachably connected in a suitable manner to form units by means of connecting webs 9, which units, in a bridging manner, reach over a control cam 11 located in a central recess 10 of the rotor 5, while respective underfaces 12 of the displacer pistons 8.1 to 8.6 support against the periphery of the control cam 11. This comprises a compression section 14, which emanates from a concentric section 13 and, in a counterclockwise sequence, comprises a starting, run-up or accelerating section, an involute section and a run-off or finishing section, which in turn runs into a concentric section 15. The latter is followed by a section extending over a centre angle of 180°, which section, accompanied by a constantly decreasing radius, passes into the concentric section 13, the curve configuration being such that the diameter dimensions are in each case smaller than the distance between the underfaces 12 of two interconnected displacer pistons. For the precompression of the conveyed or feeding material taken from the supply opening 3, concentric section 13 can be shortened in favour of a precompression section 16, which imparts a defined pre-stroke to the displacer piston running up onto said section. The supply opening 3 and the discharge opening 4 oppose one another, their peripheral extensions comprising a centre angle related to the axis 6 and having an angle dimension substantially corresponding to that of the centre angle including the compression section 14, so that two successive portion chambers 7, respectively, are connected with the discharge opening 4 or the supply opening 3.

The operating phase represented in FIG. 1 is the starting point for considering the operation:

The stuffing or filling material preferably flowing under a slight overpressure via the supply opening 3 in the region thereof against the rotor 5 has, according to this representation, filled the portion chamber 7 in front of the downwardly directed displacer piston 8.4 and is in front of the displacer piston 8.5 which has just entered the region of the supply opening 3 and is located to the left of the piston 8.4 in FIG. 1. If the rotor 5 is rotated in the direction of arrow 17 then, as a result of the contact of the underface 12 of the displacer piston 8.1 connected thereto, the displacer piston 8.4 is retracted into its basic position, i.e. into the position shown for the displacer piston 8.3, so that the filling volume of the portion chamber 7 in front of the displacement piston 8.4 reaches its maximum. During the now following angle of rotation $\theta$ of the rotor 5, including the concentric section 13 of the control cam 11, the displacer piston 8.4 retains its basic position until it reaches the position of the displacer piston 8.2. Thus, for the consideration of the operations during the further rotation of the rotor 5, it is possible to follow the displacer piston 8.2 now which, through its underface 12 running onto the compression section 14, is about to perform its dosing stroke. This starts with the running-up onto the starting section of this section, at which instant the preceding displacer piston 8.1 has reached the running-off section and with respect to its stroke rate, over this part of the compression section 14 is decreasing progressively to the same extent as that of the displacer piston 8.2 is increasing. At the instant the stroke of the preceding displacer piston 8.1 is ending, the piston 8.2 has reached the involute section following the starting section. This piston 8.2, now temporarily alone, performs the discharge of the filling material. The aforementioned sections, which are combined under compression section 14, i.e. the starting and running-off sections as well as the involute section of the control cam 11 are not designated in FIG. 1 for the sake of clarity. However, they can be seen in FIG. 3, the starting section covering the angle of rotation 14.1, the involute section the angle of rotation 14.2 and the running-off section the angle of rotation 14.3.

The course of operation will now be followed up by way of FIG. 3. Once again, the consideration follows the displacer piston 8.4, which, initially, is raised radially outwardly against the casing 2 closed in the precompression section 16 in accordance with stroke line $H_{8.4}$ under moderate acceleration $a'_{8.4}$ by a defined stroke amount precompressing the filling material in the associated portion chamber 7. Over the remainder of section 13 also including the precompression section 16, the stroke position reached at the end of the section 16 is retained after the stroke rate has been decreased by a moderate deceleration $-a'_{8.4}$. The displacer piston 8.4 now arrives over the compression section 14 of the control cam 11, over which section the portion chamber 7 is connected to the discharge opening 4 and, accompanied by moderate acceleration $a_{8.4}$, starts to discharge the filling material out of portion chamber 7 whilst passing over the starting section 14.1. Simultaneously, the stroke rate of the preceding displacer piston 8.3 was decreased through passing over the running-off section 14.3 by a deceleration $-a_{8.3}$ occurring symmetrically to the acceleration $a_{8.4}$. Towards the end of the compression section 14, the stroke rate is brought to zero, which coincides with reaching the stroke maximum. At this instant, the displacement piston 8.4 has arrived over the involute section 14.2, which imparts a uniform stroke rate $v_{8.4}$ to the piston, i.e. its acceleration drops to zero. The following passage through the running-off section 14.3 effects a deceleration $-a_{8.4}$ of the stroke rate, during which the following displacer piston 8.5 undergoes an acceleration $a_{8.5}$ symmetrically to the displacer piston 8.4 with respect to its stroke rate, in that it passes the starting section 14.1 simultaneously. Compared with the displacer piston which precedes it, this profile of motion is followed by each displacer piston with a phase displacement of 60°, so that during the effect of the starting section 14.1 and the running-off section 14.3 two displacer pistons, each, participate in the substance discharge, whereas the involute section 14.2 only has to activate one of these. If the drive of the rotor 5 takes place by a rotary angle-monitorable drive motor, a signal proportional to the discharge volume can be derived with the aforementioned conveying means with the aid of a rotation angle feed-back. Thus, this apparatus makes it possible to produce uniform (equal) portions through the successive covering of uniform (equal) rotation angles. A stepping motor shows to be most suitable for this type of drive.

What is claimed is:

1. An apparatus for discharging portions of at least one of uniform weight and volume of a pasty substance, particularly sausage stuffing, said apparatus comprising a conveying mechanism, which includes rotor means, driven to rotate about an axis of rotation and comprising stationary control cam means designed with a discharge motion controlling section;

a plurality of portion chambers for receiving said substance to be discharged; and a corresponding number of displacer pistons arranged in said portion chambers to be displaced therein during said rotation of said rotor mean by operatively engaging said cam means; and casing means, surrounding said rotor and designed with at least one supply and one discharge opening for said substance, the displacement of said pistons being such that, over a complete rotation of said rotor means, proportionality is obtained between the discharge of the substance and the angle of rotation of the rotor, w h e r e i n said discharge motion controlling section comprises a run-up section, an involute section and a run-off section, said run-up and run-off sections being designed such that the summation value of the imaginary radii drawn between said rotor axis and points, respectively, defined by said engagement of said displacer pistons with said sections during said discharging of said substance follows a linear function depending on the rotational angle of said rotor means.

2. An apparatus as claimed in claim 1, w h e r e i n said rotor means are provided with at least six radially positioned portion chambers with said displacer pistons guided therein to be displaced radially with respect to said rotor axis, and wherein said control cam means are arranged to engage with and support against underfaces formed on said displacer pistons and facing said axis of said rotor means.

3. An apparatus as claimed in claim 1, w h e r e i n two displacer pistons each are arranged in a pairwise manner to oppose each other and are rigidly interconnected.

4. An apparatus as claimed in claim 2, w h e r e i n two displacer pistons each are arranged in a pairwise manner to oppose each other and are rigidly interconnected.

* * * * *